United States Patent
Jeong

(10) Patent No.: US 9,540,057 B2
(45) Date of Patent: Jan. 10, 2017

(54) SYSTEM AND METHOD OF CONTROLLING ADJUSTABLE SPOILER

(71) Applicant: Hyundai Motor Company, Seoul (KR)

(72) Inventor: Donghyuk Jeong, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 301 days.

(21) Appl. No.: 14/483,994

(22) Filed: Sep. 11, 2014

(65) Prior Publication Data
US 2015/0149046 A1 May 28, 2015

(30) Foreign Application Priority Data
Nov. 26, 2013 (KR) .................. 10-2013-0144499

(51) Int. Cl.
| B62D 37/02 | (2006.01) |
| B62D 35/00 | (2006.01) |
| G01G 19/414 | (2006.01) |
| G05B 13/02 | (2006.01) |
| G01G 19/12 | (2006.01) |

(52) U.S. Cl.
CPC ............. *B62D 37/02* (2013.01); *B62D 35/007* (2013.01); *G01G 19/12* (2013.01); *G01G 19/4142* (2013.01)

(58) Field of Classification Search
CPC ....... B62D 37/02; B62D 35/007; G01G 19/12; G01G 19/4142
See application file for complete search history.

(56) References Cited

U.S. PATENT DOCUMENTS

| 3,768,582 | A | * | 10/1973 | Phillippe | B62D 37/02 180/903 |
| 4,810,022 | A | * | 3/1989 | Takagi | B62D 35/005 180/197 |
| 6,170,904 | B1 | * | 1/2001 | Schaedlich | B62D 35/007 180/903 |
| 2005/0023867 | A1 | * | 2/2005 | Kreiner | B60J 7/0573 296/223 |
| 2005/0203684 | A1 | * | 9/2005 | Borgesson | B60K 35/00 701/36 |
| 2007/0145776 | A1 | * | 6/2007 | Grave | B62D 35/007 296/180.5 |
| 2011/0148143 | A1 | * | 6/2011 | Ondracek | B62D 35/008 296/180.5 |

(Continued)

FOREIGN PATENT DOCUMENTS

| JP | 05-112265 A | 5/1993 |
| JP | 2941202 B2 | 8/1999 |

(Continued)

*Primary Examiner* — Mussa A Shaawat
(74) *Attorney, Agent, or Firm* — McDermott Will & Emery LLP

(57) ABSTRACT

A system of controlling an adjustable spoiler includes an ignition detector configured to detect whether an engine is turned on or off. A vehicle speed detector is configured to detect a vehicle speed. A weight detector is configured to detect a vehicle weight that is changed when the number of passengers or the amount of loaded freight is increased or decreased. A controller is configured to determine variation of the vehicle weight, set an extension reference speed and a retraction reference speed of the adjustable spoiler based on the variation of the vehicle weight, and extend or retract the adjustable spoiler trough an actuator.

15 Claims, 2 Drawing Sheets

(56) References Cited

U.S. PATENT DOCUMENTS

| | | | | |
|---|---|---|---|---|
| 2013/0221701 A1* | 8/2013 | De Luca | ................ | B62D 37/02 |
| | | | | 296/180.5 |
| 2013/0226414 A1* | 8/2013 | De Luca | ................ | B62D 37/02 |
| | | | | 701/49 |
| 2014/0192545 A1* | 7/2014 | Law | .................... | B60Q 1/0017 |
| | | | | 362/485 |
| 2014/0271192 A1* | 9/2014 | Brooks | .................. | F03D 7/022 |
| | | | | 416/23 |

FOREIGN PATENT DOCUMENTS

| | | |
|---|---|---|
| JP | 2008-037205 A | 2/2008 |
| KR | 10-0292774 B1 | 3/2001 |

* cited by examiner

SYSTEM AND METHOD OF CONTROLLING ADJUSTABLE SPOILER

CROSS-REFERENCE TO RELATED APPLICATION

This application claims the benefit of priority to Korean Patent Application No. 10-2013-0144499 filed in the Korean Intellectual Property Office on Nov. 26, 2013, the entire contents of which are incorporated herein by reference.

TECHNICAL FIELD

The present disclosure relates to a system and a method of controlling an adjustable spoiler. More particularly, the present disclosure relates to a system and a method of controlling an adjustable spoiler which can change a vehicle speed reference for extending the adjustable spoiler depending on a vehicle weight.

BACKGROUND

When a vehicle travels at a high speed, a lift force is generated in a vertical direction of the vehicle, and a grip force of a tire is reduced because of an aerodynamic force that flows along a surface of the vehicle, thereby adversely affecting traveling stability.

Since an upper portion of the vehicle has a curved shape and a lower portion of the vehicle is a plate shape, a flow velocity of air flowing along the upper portion of the vehicle is faster than a flow velocity of air flowing along the lower portion of the vehicle, and a pressure difference between the upper portion and the lower portion of the vehicle is generated. Thus, the lift force is generated by the pressure difference.

A fixed spoiler disposed at an upper portion of a trunk lid has been developed for reducing the lift force. The fixed spoiler disposed at the upper portion of the trunk lid may provide a compensation operation of the lift force when the vehicle travels at a high speed, such that the traveling stability and stable braking force may be provided by increasing a frictional force of the tire.

However, in the case of using the fixed spoiler, air resistance flowing along the surface of the vehicle is increased when the vehicle travels at a low speed, and thus, fuel efficiency and traveling performance are deteriorated.

In order to solve the problems, an adjustable spoiler that is extended when the vehicle speed is higher than a reference vehicle speed for reducing the lift force and increasing the grip force has been developed. The extension of the conventional adjustable spoiler is performed according only to a vehicle speed condition.

Even though a sufficient grip force of the tire is generated in a case that the vehicle weight is increased by the number of passengers or the amount of loaded freight, the adjustable spoiler is extended when the vehicle speed condition is satisfied, and thus, a drag force due to the aerodynamic force and rolling resistance of the tire due to an unnecessarily tire load are generated. The drag force and the rolling resistance of the tire may decrease fuel efficiency.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide a system and a method of controlling an adjustable spoiler having advantages of changing a reference vehicle speed for extending the adjustable spoiler depending on a vehicle weight, such that fuel efficiency can be improved.

A system of controlling an adjustable spoiler may include an ignition detector configured to detect whether an engine is turned on or off. A vehicle speed detector is configured to detect a vehicle speed. A weight detector is configured to detect a vehicle weight that is changed when the number of passengers or the amount of loaded freight is increased or decreased. A controller is configured to determine variation of the vehicle weight, set an extension reference speed and a retraction reference speed of the adjustable spoiler based on the variation of the vehicle weight, and extend or retract the adjustable spoiler through an actuator.

The weight detector may include at least one of an overall height sensor of a suspension system, a pressure sensor of an air suspension system, and a tire air pressure sensor.

The controller may determine the variation of the vehicle weight until the vehicle starts moving after the engine is turned on.

The controller may determine the variation of the vehicle weight until the vehicle speed becomes a reference vehicle speed after the engine is turned on.

The controller may control an extension height, an extension angle, and an extension width of the adjustable spoiler when the adjustable spoiler is extended.

The controller may vary the extension reference speed and the retraction reference speed depending on the variation of the vehicle weight with reference to a state in which a driver is inside the vehicle.

A method of controlling an adjustable spoiler according to an exemplary embodiment of the present disclosure may include determining variation of a vehicle weight, which is changed when the number of passengers or the amount of loaded freight is increased or decreased, when an engine is turned on. An extension reference speed and a retraction reference speed are set based on the variation of the vehicle weight. Whether a vehicle speed is greater than the extension reference speed is determined. The adjustable spoiler is extended through an actuator when the vehicle speed is greater than the extension reference speed.

The variation of the vehicle weight may be determined based on at least one of a torque load of a power train, an overall height difference of a suspension system and a pressure difference of an air suspension, and a tire air pressure difference.

The variation of the vehicle weight may be determined until the vehicle starts moving after the engine is turned on.

The variation of the vehicle weight may be determined until the vehicle speed becomes a reference vehicle speed after the engine is turned on.

The extension reference speed and the retraction reference speed may vary depending on the variation of the vehicle weight as a driver is inside the vehicle.

The method may further include determining whether the vehicle speed is less than the retraction reference speed in a state where the adjustable spoiler is extended. The adjustable spoiler is retracted through the actuator when the vehicle speed is less than the retraction reference speed.

An extension height, an extension angle, and an extension width of the adjustable spoiler may be controlled when the adjustable spoiler is extended.

According to an exemplary embodiment of the present disclosure, since a grip force of the tire is increased in a case that the vehicle weight is increased by the number of passengers or the amount of loaded freight, the extension of the adjustable spoiler is not performed when the grip force of the tire is sufficient.

In addition, since a drag force due to aerodynamic force and rolling resistance of the tire is minimized by varying the extension reference speed of the adjustable spoiler depending on the vehicle weight, it is possible to simultaneously improve stability in high speed driving and fuel efficiency.

DETAILED DESCRIPTION

Figure 1:
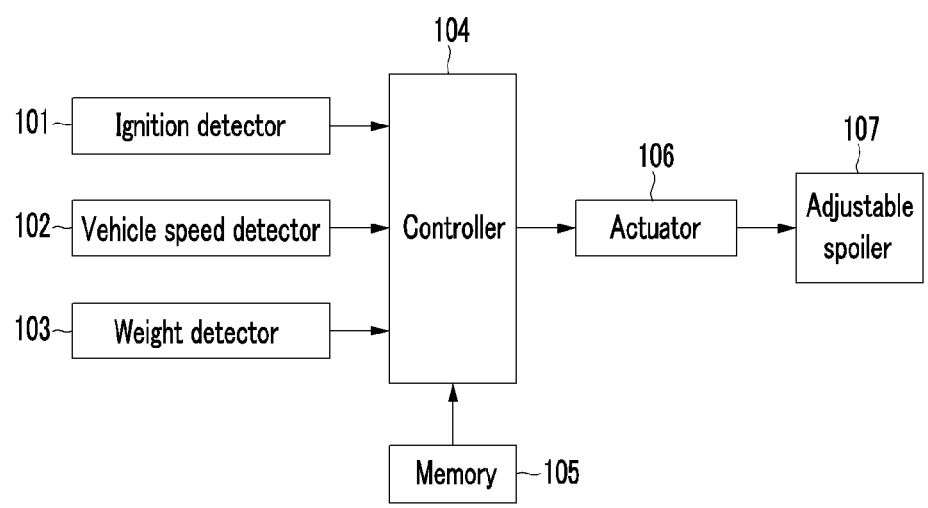
FIG. 1 is a block diagram of a system of controlling an adjustable spoiler according to an exemplary embodiment of the present disclosure.

Hereinafter, an exemplary embodiment of the present disclosure will be described in detail with reference to the accompanying drawings so that those skilled in the technical field to which the present disclosure pertains may carry out the exemplary embodiment.

As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Further, the configurations shown in the drawings are provided selectively for convenience of description, and the present invention is not limited to those shown in the drawings.

FIG. 1 is a block diagram of a system of controlling an adjustable spoiler according to an exemplary embodiment of the present disclosure.

Referring to FIG. 1, a system of controlling an adjustable spoiler 107 according to an exemplary embodiment of the present disclosure may include an ignition detector 101, a vehicle speed detector 102, a weight detector 103, a controller 104, a memory 105, and an actuator 106.

The ignition detector 101 detects whether an engine is turned on or off, and transmits a signal corresponding thereto to the controller 104.

The vehicle speed detector 102 detects a vehicle speed and transmits a signal corresponding thereto to the controller 104. The vehicle speed detector 102 includes a wheel speed sensor mounted at a wheel of a vehicle.

The weight detector 103 detects a vehicle weight that changes when the number of passengers or the amount of loaded freight is increased or decreased, and transmits a signal corresponding thereto to the controller 104. The weight detector 103 may detect the vehicle weight based on a torque load of a power train.

The weight detector 103 may be an overall height sensor of a suspension system. The vehicle weight may be detected based on an overall height difference of the suspension system that is changed as the number of passengers or the amount of loaded freight is increased or decreased.

The weight detector 103 may be a pressure sensor of an air suspension system. The vehicle weight may be detected based on a pressure difference of the air suspension system that is changed as the number of passengers or amount of loaded freight is increased or decreased.

The weight detector 103 may be a tire air pressure sensor. The vehicle weight may be detected based on a tire air pressure difference that is changed as the number of passengers or the amount of loaded freight is increased or decreased.

The controller 104 may be implemented with one or more microprocessors executed by a predetermined program of a non-transitory computer-readable medium. The predetermined program may include a series of commands for performing each step included in a method of controlling the adjustable spoiler 107 according to an exemplary embodiment of the present disclosure.

The controller 104 may determine variation of the vehicle weight until the vehicle starts moving after the engine is turned on, and set an extension reference speed and a retraction reference speed of the adjustable spoiler 107 based on the variation of the vehicle weight.

The controller 104 may determine the variation of the vehicle weight until the vehicle speed becomes a reference vehicle speed (e.g., 10 kph) after the engine is turned on, and set the extension reference speed and the retraction reference speed of the adjustable spoiler 107.

The extension reference speed and the retraction reference speed may be set as follows:

The controller 104 may vary the extension reference speed and the retraction reference speed depending on the variation of the vehicle weight with reference to a state in which a driver is inside the vehicle.

The controller 104 may set the extension reference speed to be 120 kph and the retraction reference speed to be 80 kph when the variation of the vehicle weight is within a range of 0 kg to 80 kg.

The controller 104 may set the extension reference speed to be 140 kph and the retraction reference speed to be 100 kph when the variation of the vehicle weight is within a range of 80 kg to 160 kg.

The controller 104 may set the extension reference speed to be 160 kph and the retraction reference speed to be 120 kph when the variation of the vehicle weight is greater than 160 kg.

The adjustable spoiler 107 may include a front adjustable spoiler disposed at a front side of the vehicle and a rear adjustable spoiler disposed at a rear side of the vehicle.

The controller 104 may set extension reference speeds and retraction reference speeds of the front adjustable spoiler and the rear adjustable spoiler as follows:

The controller 104 may vary the extension reference speed and the retraction reference speed of the front adjustable spoiler depending on a variation of a front tire load with reference to a state in which the driver is within the vehicle.

The controller 104 may set the extension reference speed of the front adjustable spoiler to be 120 kph and the retraction reference speed of the front adjustable spoiler to be 80 kph when the variation of the front tire load is within a range of 0 kg to 40 kg.

The controller 104 may set the extension reference speed of the front adjustable spoiler to be 140 kph and the retraction reference speed of the front adjustable spoiler to be 100 kph when the variation of the front tire load is within a range of 40 kg to 80 kg.

The controller 104 may set the extension reference speed of the front adjustable spoiler to be 160 kph and the retraction reference speed of the front adjustable spoiler to be 120 kph when the variation of the front tire load is greater than 80 kg.

The controller 104 may vary the extension reference speed and the retraction reference speed of the rear adjustable spoiler depending on a variation of a rear tire load with reference to the state in which the driver is within the vehicle by the same method as the method of setting the extension reference speed and the retraction reference speed of the front adjustable spoiler.

The extension reference speeds and the retraction speeds of the adjustable spoiler 107 are just examples, and may be changed in accordance with a vehicle model and characteristics of the adjustable spoiler 107.

The controller 104 determines the vehicle speed and extends the adjustable spoiler 107 through the actuator 106 when the vehicle speed is greater than the extension reference speed that is set depending on the variation of the vehicle weight.

The controller 104 retracts the adjustable spoiler 107 through the actuator 106 when the vehicle speed is less than the retraction reference speed in a state where the adjustable spoiler 107 is extended.

The controller 104 may control an extension height, an extension angle, and an extension width of the adjustable spoiler 107 when the adjustable spoiler 107 is extended, such that a downforce of the vehicle may be stably controlled.

The extension reference speeds and the retraction reference speeds of the adjustable spoiler 107 are stored in the memory 105 as a map table for each variation of the vehicle weight.

The actuator 106 operates the adjustable spoiler 107 to be extended or retracted according to a control signal received from the controller 104.

The actuator 106 may adjust the extension height, the extension angle, and the extension width of the adjustable spoiler 107 according to the control signal received from the controller 104, such that a stable downforce of the vehicle may be provided.

Hereinafter, referring to FIG. 2, the method of controlling the adjustable spoiler 107 according to an exemplary embodiment of the present disclosure will be described in detail.

Figure 2:
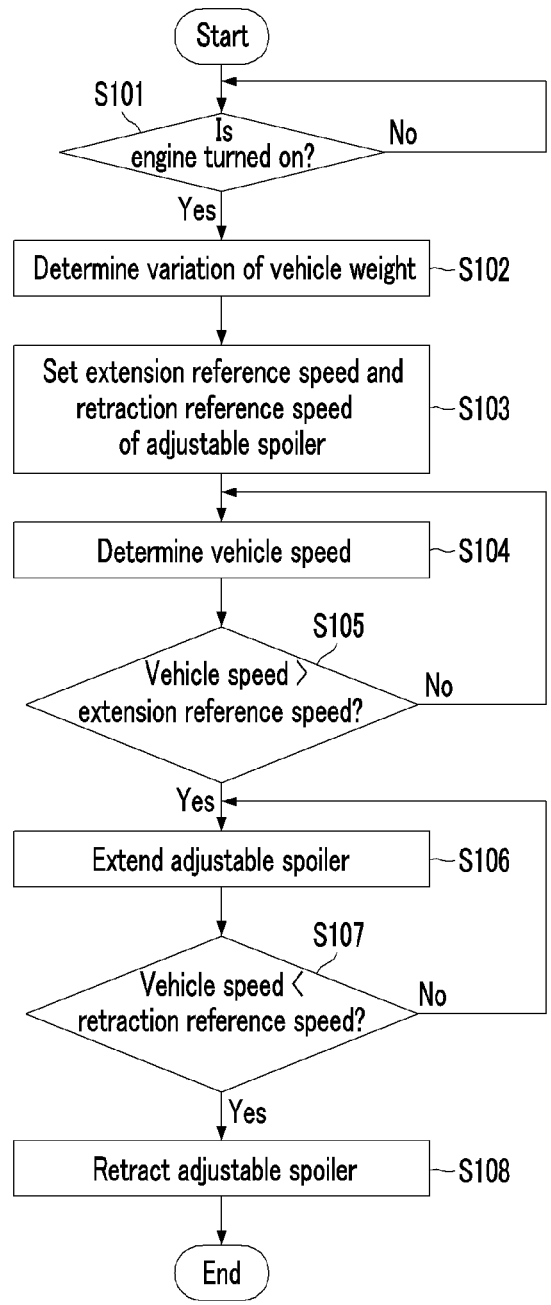
FIG. 2 is a flowchart of a method of controlling an adjustable spoiler according to an exemplary embodiment of the present disclosure.

FIG. 2 is a flowchart of a method of controlling the adjustable spoiler according to an exemplary embodiment of the present disclosure.

The controller 104 determines whether the engine is turned on according to the signal received from the ignition detector 101 at step S101.

When the engine is turned on at step S101, the controller 104 may determine the variation of the vehicle weight, which changes when the number of passengers or the amount of loaded freight is increased or decreased, until the vehicle starts moving at step S102. In addition, the controller 104 may determine the variation of the vehicle weight until the vehicle speed becomes the reference vehicle speed (e.g., 10 kph) after the engine is turned on.

The variation of the vehicle weight may be determined based on at least one of the torque load of the power train, the overall height difference, the pressure difference of the air suspension, and the tire air pressure difference.

When the variation of the vehicle weight is determined at step S102, the controller 104 sets the extension reference speed and the retraction reference speed of the adjustable spoiler 107 based on the variation of the vehicle weight using the map table stored in the memory 105 at step S103.

The extension reference speed and the retraction reference speed of the adjustable spoiler 107 may be set as follows:

The controller 104 may vary the extension reference speed and the retraction reference speed depending on the variation of the vehicle weight with reference to the state in which the driver is inside the vehicle.

The controller 104 may set the extension reference speed to be 120 kph and the retraction reference speed to be 80 kph when the variation of the vehicle weight is within the range of 0 kg to 80 kg.

The controller 104 may set the extension reference speed to be 140 kph and the retraction reference speed to be 100 kph when the variation of the vehicle weight is within the range of 80 kg to 160 kg.

The controller 104 may set the extension reference speed to be 160 kph and the retraction reference speed to be 120 kph when the variation of the vehicle weight is greater than 160 kg.

The adjustable spoiler 107 may include the front adjustable spoiler disposed at the front of the vehicle and the rear adjustable spoiler disposed at the rear of the vehicle.

The controller 104 may set the extension reference speeds and retraction reference speeds of the front adjustable spoiler and the rear adjustable spoiler as follows.

The controller 104 may vary the extension reference speed and the retraction reference speed of the front adjustable spoiler depending on the variation of the front tire load with reference to the state in which the driver is inside the vehicle.

The controller 104 may set the extension reference speed of the front adjustable spoiler to be 120 kph and the retraction reference speed of the front adjustable spoiler to be 80 kph when the variation of the front tire load is within the range of 0 kg to 40 kg.

The controller 104 may set the extension reference speed of the front adjustable spoiler to be 140 kph and the retraction reference speed of the front adjustable spoiler to be 100 kph when the variation of the front tire load is within the range of 40 kg to 80 kg.

The controller 104 may set the extension reference speed of the front adjustable spoiler to be 160 kph and the retraction reference speed of the front adjustable spoiler to be 120 kph when the variation of the front tire load is greater than 80 kg.

The controller 104 may vary the extension reference speed and the retraction reference speed of the rear adjustable spoiler depending on the variation of the rear tire load with reference to the state in which the driver is inside the vehicle by the same method as the method of setting the extension reference speed and the retraction speed of the front adjustable spoiler.

The extension reference speeds and the retraction speeds of the adjustable spoiler 107 are just an example, and may be changed in accordance with the vehicle model and characteristics of the adjustable spoiler 107.

The controller 104 determines the vehicle speed at step S104, and determines whether the vehicle speed is greater than the extension reference speed at step S105.

The controller 104 extends the adjustable spoiler 107 through the actuator 106 when the vehicle speed is greater than the extension reference speed at step S106. In this case, the controller 104 may control an extension height, an extension angle, and an extension width of the adjustable spoiler 107, such that a downforce of the vehicle may be stably controlled.

The controller 104 retracts the adjustable spoiler 107 through the actuator 106 when the vehicle speed is less than the retraction reference speed in the state where the adjustable spoiler 107 is extended at step S108.

When the vehicle speed is greater than or equal to the retraction reference speed at step S107, the adjustable spoiler 107 is maintained in the extended state.

As described above, according to an exemplary embodiment of the present disclosure, since a grip force of the tires is increased in a case that the vehicle weight is increased by the number of passengers or the amount of loaded freight, the extension of the adjustable spoiler 107 is not performed when the grip force of the tires is sufficient. In addition, since a drag force due to an aerodynamic force and rolling resistance of the tires is minimized by varying the extension reference speed of the adjustable spoiler 107 depending on the vehicle weight, it is possible to simultaneously improve stability in high speed driving and fuel efficiency.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A system of controlling an adjustable spoiler, comprising:
    an ignition detector configured to detect whether an engine is turned on or off;
    a vehicle speed detector configured to detect a vehicle speed;
    a weight detector configured to detect a vehicle weight that is changed when the number of passengers or the amount of loaded freight is increased or decreased; and
    a controller configured to determine variation of the vehicle weight, set an extension reference speed and a retraction reference speed of the adjustable spoiler based on the variation of the vehicle weight, and extend or retract the adjustable spoiler trough an actuator.

2. The system of claim 1, wherein the weight detector comprises at least one of an overall height sensor of a suspension system, a pressure sensor of an air suspension system, and a tire air pressure sensor.

3. The system of claim 1, wherein the controller determines the variation of the vehicle weight until the vehicle starts moving after the engine is turned on.

4. The system of claim 1, wherein the controller determines the variation of the vehicle weight until the vehicle speed becomes a reference vehicle speed after the engine is turned on.

5. The system of claim 1, wherein the controller controls an extension height, an extension angle, and an extension width of the adjustable spoiler when the adjustable spoiler is extended.

6. The system of claim 1, wherein the controller varies the extension reference speed and the retraction reference speed depending on the variation of the vehicle weight as a driver is inside the vehicle.

7. The system of claim 1, wherein the extension reference speed and the retraction reference speed of the adjustable spoiler are stored in a memory as a map table for each variation of the vehicle weight.

8. A method of controlling an adjustable spoiler, comprising steps of:
    determining variation of a vehicle weight, which is changed when the number of passengers or the amount of loaded freight is increased or decreased, when an engine is turned on;
    setting an extension reference speed and a retraction reference speed based on the variation of the vehicle weight;
    determining whether a vehicle speed is greater than the extension reference speed; and
    extending the adjustable spoiler through an actuator when the vehicle speed is greater than the extension reference speed.

9. The method of claim 8, wherein the variation of the vehicle weight is determined based on at least one of a torque load of a power train, an overall height difference of a suspension system, a pressure difference of an air suspension system, and a tire air pressure difference.

10. The method of claim 8, wherein the step of determining the variation of the vehicle weight is performed until a vehicle starts moving after the engine is turned on.

11. The method of claim 8, wherein the step of determining the vehicle weight is performed until the vehicle speed becomes a reference vehicle speed after the engine is turned on.

12. The method of claim 8, wherein the extension reference speed and the retraction reference speed vary depending on the variation of the vehicle weight as a driver is inside the vehicle.

13. The method of claim 8, further comprising steps of:
    determining whether the vehicle speed is less than the retraction reference speed in a state where the adjustable spoiler is extended; and
    retracting the adjustable spoiler through the actuator when the vehicle speed is less than the retraction reference speed.

14. The method of claim 8, wherein an extension height, an extension angle, and an extension width of the adjustable spoiler are controlled when the adjustable spoiler is extended.

15. A non-transitory computer readable medium including instructions, execution of which causes a controller to perform the steps of claim 8.

* * * * *